Figure 2:
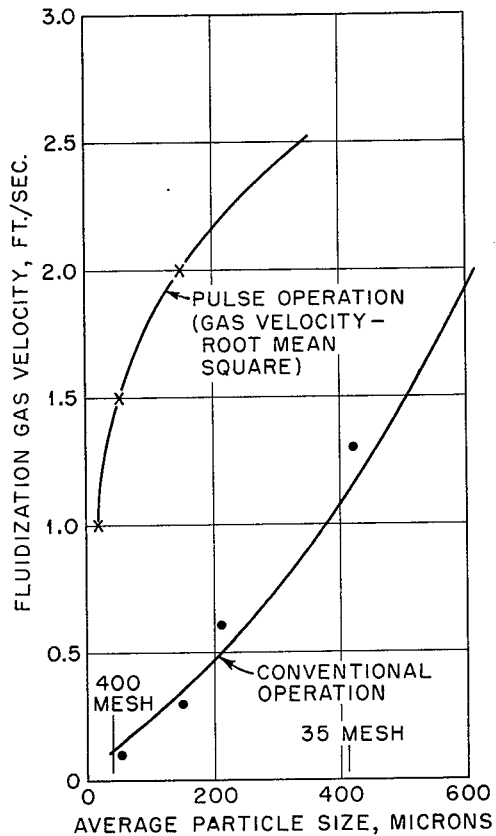

Jan. 5, 1965  R. P. LEVEY, JR  3,164,440
GAS–SOLIDS CONTACTING METHOD
Filed Oct. 31, 1961

INVENTOR.
Ralph P. Levey, Jr.
BY Roland A. Anderson
ATTORNEY

United States Patent Office 3,164,440
Patented Jan. 5, 1965

3,164,440
GAS-SOLIDS CONTACTING METHOD
Ralph P. Levey, Jr., Oak Ridge, Tenn., assignor to the United States of America as represented by the United States Atomic Energy Commission
Filed Oct. 31, 1961, Ser. No. 150,613
7 Claims. (Cl. 23—1)

My invention relates in general to gas-solids contacting methods and more particularly to fluidized bed methods of effecting contact between a gas and a solid.

In gas-solids fluidized bed systems particulate solids are contacted with a gas stream in such a manner that the solids are supported by the gas stream and exhibit many of the characteristics of fluids. There are many advantages in contacting gases and solids in such a manner as to fluidize the solids, including high contact efficiency, close temperature control, and high heat and mass transfer rates. Although fluidized bed systems have advantages over other means for effecting gas-solids contact, the nature of the fluidization process introduces problems in some instances. Some of these problems arise from the fact that the gas velocity required for fluidization decreases with a decrease in particle size. Thus, with fine powders, conventional fluidization techniques require low gas velocities in order to avoid sweeping the particles out of the fluidization zone. For instance, the maximum gas velocity for fluidizing $UF_4$ particles having a diameter of approximately 100 microns is approximately 0.1 foot per second. These low velocities result in an excessively long time for contacting the particles with a sufficient amount of gas to effect chemical or physical changes in the particles.

In attempting to carry out a fluidization process wherein the solids being fluidized comprise particles of different diameters, gas velocities too low to fluidize the large particles sweep the small particles outside the fluidizing zone. If the ratio of maximum to minimum particle diameter is in the ratio of 10:1 or greater conventional fluidizing processes are impracticable.

One object of my invention is to provide an improved method for effecting contact between a gas and a solid.

Another object of my invention is to provide an improved method for carrying out a fluidization process for contacting particulate solids with a gas.

Another object of my invention is to provide a method of fluidizing finely-divided solids at a high gas velocity.

Still another object of my invention is to provide a method of fluidizing particulate solids comprised of particles having a wide range of diameters.

Other objects of my invention will become apparent from the following detailed description and the claims appended thereto.

In accordance with my invention I have provided a method of carrying out a fluidization process for contacting a bed of particulate solids with a gas comprising the steps of:

(a) Establishing a bed of particles in a fluidizing zone, said bed having a top surface and a bottom surface;

(b) Introducing said gas upwardly into said bed of particles at a rate sufficient to lift said bed as a compact mass to a position where the top surface of said bed is from 1.5 to 2 times as high, with reference to the position of the bottom surface of the bed at rest, as said upper surface of the bed at rest;

(c) Immediately reducing the flow of said gas into said bed to a rate insufficient to support said particles, whereby said particles fall; and (d) Repeating the cycle of steps (b) and (c) after the upper surface of said bed has fallen a distance of at least 25 percent of the height of the bed at rest and before said bed has reached a quiescent state.

Using my fluidizing method the average flow rate of a fluidizing gas can be greatly increased without sweeping particles from the fluidizing zone. Particles having diameters as low as one micron can be fluidized with average gas velocities up to one foot per second which may be compared to average gas velocities of less than 0.1 foot per second using conventional fluidizing techniques. Using my method a bed of solids having a particle size range of from 10 to 5000 microns can be fluidized in its entirety without sweeping the small particles from the fluidizing zone. My method is particularly useful in effecting gas-solids reactions since the time required to bring stoichiometric quantities of gas in contact with the solids is reduced greatly. Using my method it has been possible to prepare with ease some submicron particles of highly pyrophoric metals which have been virtually impossible to prepare by other fluidization techniques.

In carrying out my invention the fluidizing gas must be introduced upwardly into the bed of solids at a pressure and volume sufficient to lift the bed, in a compact form, to a position where the upper surface of the bed is from 1.5 to 2 times its original height above the bottom of the fluidizing zone. Even relatively low pressures, i.e., pressures slightly exceeding the pressure exerted by the bed of solids, may of course ultimately cause the top of the bed to rise to this level if the pressure is exerted for a sufficient period of time. However, in order to achieve high gas flows through the bed of solids it is imperative that the bed be lifted rapidly. Pressures which lift the bed rapidly enough exert enough pressure on the bottom of the bed to put the bed in a state of compression while it is being lifted. I have found that an initial inlet pressure of at least three times the pressure exerted by the bed of solids is required in order to lift the bed rapidly enough to significantly improve the rate of gas flow, and higher pressures are desirable. However, too high a pressure will force a slug of solids through the bed instead of lifting the entire bed and I have found that the initial pressure should not exceed ten times the pressure exerted by the bed of solids.

The volume of gas introduced must be sufficient to lift the bed the desired distance. This volume, measured at the inlet pressure, may satisfactorily vary from one-fifth to twice the volume of the bed at rest, and the preferred volume is from one-half to a volume equal to the bed volume. The volume employed is dependent upon the pressure used, the distance the bed is lifted being a function of the product of the pressure and volume. Normally the higher pressures are desirable since the bed is lifted more rapidly with high pressures; consequently, volumes of gas in the lower part of this range are ordinarily used. However, under some conditions it may be desirable to operate with low pressures, and in this case volumes in the high part of the range are required.

After the bed has been lifted to its desired upper limit the gas flow is immediately reduced to a rate too low to support the particles. In the preferred form of carrying out my method the gas flow is stopped. Immediately after the gas flow is thus reduced, the solids begin to fall. Those at the bottom of the bed fall first, and the particles thus separate causing the bed to expand until it occupies approximately the volume of the zone through which the bed has moved. At this point the bed is from 150 to 200 percent of its original volume. As the particles continue to fall the bed contracts in volume, rapidly at first to an intermediate value, e.g., to about 120 percent of its volume at rest and then less rapidly to a still lower position. Normally the solids will not subside to the original level merely by settling. In order to achieve the objects of my invention it is necessary to permit the upper surface of the bed to fall at least 25 percent of the height of the bed at rest before introducing an additional pulse of gas. There is no advantage gained in delaying the next pulse beyond the time the bed has reached a quiescent state, and in the preferred form of carrying out my process the succeeding pulse is introduced when the volume of the bed has fallen to 110 to 150 percent of its volume at rest.

The pulse rate which results from this series of cycles varies with the physical characteristics of the solids and the fluidizing gas. I have found that the pulse frequency decreases with an increase in solids mass, solids viscosity and gas viscosity. Pulse frequencies for uranium oxide and uranium tetrafluoride having particle diameters of 1 to 5,000 microns varies from 30 to 60. With lighter particles, such as calcium sulfate, the pulse frequency may reach 150 cycles per minute.

As a necessary result of the distance the bed is lifted, the top of the bed at rest must be considerably below the top of the fluidizing zone, and in the preferred method of carrying out my invention the reactor is filled halfway or less.

A bed of any height or diameter suitable for conventional fluidizing techniques may be used in my fluidizing method. My method is particularly suitable for bed heights in the range of one to six feet.

Figure 1:
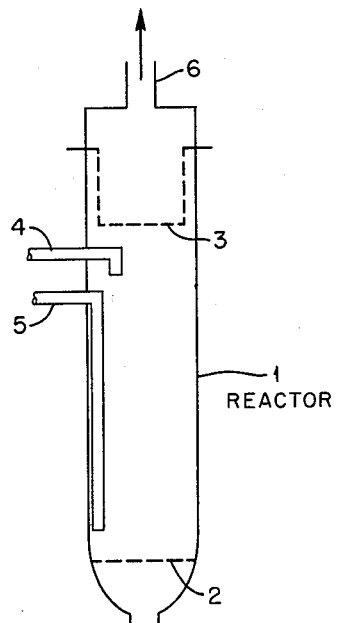
Figure 1:
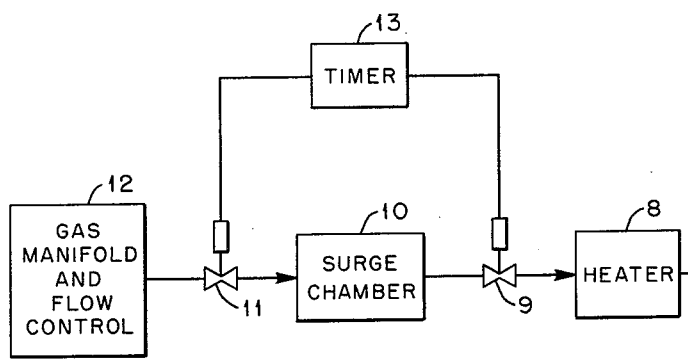

Referring to FIG. 1, which shows one embodiment of a system in which my fluidization method may be carried out, a conventional fluid bed reactor 1 is provided with a porous gas distribution plate 2 and a filter 3 for removing entrained solids. The reactor is provided with solids introducing means 4 and solids removal means 5, gas removal means 6 and gas inlet means 7. A gas manifold 12 is connected to gas inlet means 7 through solenoid valve 9, surge chamber 10, solenoid valve 11 and a heater 8. The solenoid valves 9 and 11 are alternately operated by a timer 13.

Any conventional fluid bed system may readily be modified to fluidize particles according to my method by incorporating suitable means for introducing the fluidizing gas in pulses. Other suitable means for introducing the gas in pulses will be apparent to the ordinary worker in the art.

Having thus described my invention, I offer the following examples to illustrate my invention in greater detail. Examples I and III demonstrate my method of carrying out a fluidization process; Example II demonstrates a fluidization process using conventional fluidizing techniques; and Example IV illustrates the increased gas velocity which can be achieved using my fluidization method.

Example I

The system of FIG. 1 was used according to my improved fluidizing method in a reaction reducing $U_3O_8$ to $UO_2$ with hydrogen and then hydrofluorinating the resulting $UO_2$ to $UF_4$. A cylindrical reactor 5 inches in diameter and 64 inches long, provided with external heaters, was charged with 25 pounds of $U_3O_8$, the depth of the bed being approximately 30 inches. (The depth of the bed if vibrated by tapping would have been approximately 26 inches.) All of the $U_3O_8$ particles had a diameter less than 100 microns, with 50 percent of the particles being smaller than 20 microns and 10 percent being smaller than 3 microns. At the start of the run the reactor heaters were energized and the timer 13 was set to alternately charge and discharge the surge chamber with nitrogen. The volume of the surge chamber 10 was 0.116 cubic foot and the pressure of the gas stored therein was 10 p.s.i.g. The nitrogen discharged into the bed raised the top of the bed from 30 inches to 50 inches. The timer was set to send another surge of gas into the reactor when the bed level settled approximately to the original position. The pulse rate was 44 pulses per minute. The pressure at the reactor exit was atmospheric. After the temperature within the reactor reached 1000° F., a small proportion of $H_2$ was introduced into the nitrogen stream. The gas heater 8 was adjusted so that the gas entering the reactor was at a temperature of approximately 1000° F. With the reactor maintained at a temperature between 1000° F. and 1100° F. the proportion of $H_2$ in the fluidizing gas was increased gradually until it consisted solely of $H_2$, the amount of $H_2$ finally admitted being about five times the stoichiometric amount required to convert the $U_3O_8$ to $UO_2$. About 1½ hours were required to carry out the reduction reaction. The rate of introduction of gas was six standard cubic feet per minute, corresponding to a root-mean-square velocity of gas flow through the reactor of 2 feet per second.

When the reduction reaction was considered complete, the reactor was permitted to cool to about 500° F., with the $H_2$ still flowing. HF then was gradually admitted to the $H_2$ stream leaving the gas manifold 12, and the hydrofluorination reaction was conducted in a manner generally similar to that described for reduction, with the exception that the reactor temperature was maintained in the range of 500°–700° F., the gas temperature at the outlet of the heater 8 was maintained at about 400° F., and the pressure of gas in the surge chamber was increased to 15 p.s.i.g. Since the powder bed tends to become more viscous in the course of the hydrofluorination reaction even with the increased pressure the bed expanded less than in the reduction reaction, the top of the expanded bed being only approximately 40 inches above the bottom. Over a period of about two hours, the proportion of HF was gradually increased until the input gas consisted mainly of HF. Throughout the hydrofluorination run, however, a small proportion of $H_2$ was maintained in the input stream to make the fluidizing gas less viscous and thus permit the use of higher conversion temperatures without caking.

At the end of about two hours of hydrofluorination, the reactor temperature was raised to 1000° F. for a few minutes to ensure completion of the reaction. The total amount of HF fed to the reactor during the run was equivalent to about three times the stoichiometric requirement. After a few minutes' hydrofluorination at 1000° F., the reactor temperature was reduced to 500° F., and the gas input to the reactor was changed to $N_2$. After further cooling, the powder in the reactor was withdrawn through the line 5. The rate of introduction of gas was 8 standard cubic feet per minute, corresponding to a root-mean-square gas velocity through the reactor during hydrofluorination of about 1.5 ft./sec. During hydrofluorination, the bed depth fluctuated between about 30 inches and 40 inches, and the pulse rate was 36 pulses per minute.

In the run described above, the reduction efficiency was over 99 percent and conversion to $UF_4$ was 94.7% (based on percent $UF_4$). The total run time, including heat-up and cool-down time, was eight hours.

Example II

In a run identical to that of Example I, with the exception that the fluidizing gas was introduced in a conventional manner, i.e., at a vrtually constant rate, the maximum gas velocity attainable without packing the solids against the top of the reactor was 0.1 foot per second and a total of 24 hours was required for the conversion of $U_3O_8$ powder to $UF_4$.

As can be seen fom a comparison of the data of Examples I and II, my method of introducing the fluidization gas permits a great increase in gas velocity through the fluidized bed—in this case the gas velocity is increased by a factor of 20—and the time required to complete a reaction between a gas and the fluidized particles is markedly reduced—in this case from 24 hours to 8 hours.

Example III

The fluidizing gas velocity for a series of samples of $UF_4$ particles having different average sizes was determined for my fluidizing method using the system of FIG.

1 and for a conventional method. The resulting data are given in FIG. 2.

As can be seen from the data in FIG. 2, my fluidization method permits a great increase in the fluidizing gas velocity over a wide range of average particle sizes.

*Example IV*

The system of Example I was employed using my fluidizing method for the reduction and hydrofluorination of ammonium diuranate filter cake having a particle size distribution of from approximately one to five thousand microns. A screen analysis showed that 70.6 percent were under 4 mesh (4699 microns); 25.5 percent were under 35 mesh (417 microns); 15.9 percent were under 100 mesh (147 microns); 10.5 percent were under 200 mesh (74 microns); and 5.1 percent were under 325 mesh (43 microns). A hydrogen reduction efficiency of 98 percent was obtained with 90 percent conversion to $UF_4$. The total run time was approximately 8 hours.

The data of Example IV demonstrates the applicability of my fluidizing method to particles having a wide particle size distribution. Conventional fluidization techniques are inapplicable to such powders.

My method is highly useful in fluidizing fine particles (i.e., those having diameters less than 100 microns) because of the low velocity of fluidizing gas using conventional techniques plus the fact that due to increased surface area a gas can react at a greater rate if a sufficient quantity is brought into contact with the solids. However, it is obvious that my method is applicable to solids having a wide range of physical properties such as size, configuration and density, and that my method may be employed regardless of the nature of the fluidized system by merely providing means for introducing the fluidizing gas in pulses as described herein.

The above examples are intended merely to illustrate my invention and it is intended that my invention be limited only as indicated by the appended claims.

In the foregoing description and in the attached claims by "bed at rest" I mean a completely settled bed, such as is achieved by vibrating or tapping the reactor walls.

This application is a continuation-in-part of my earlier application Serial No. 810,975, filed May 4, 1959, now abandoned.

What is claimed is:
1. A method of carrying out a fluidization process for contacting a bed of particulate solids with a gas comprising the steps of:

(a) establishing a bed of particles in a fluidizing zone, said bed having a top surface and a bottom surface;
(b) introducing said gas upwardly into said bed of particles at a rate sufficient to lift said bed as a compact mass to a position where the top surface of said bed is from 1.5 to 2 times as high, with reference to the position of the bottom surface of the bed at rest, as said upper surface of the bed at rest;
(c) immediately reducing the flow of said gas into said bed to a rate insufficient to support said particles, whereby said particles fall; and
(d) repeating the cycle of steps (b) and (c) after the upper surface of said bed has fallen a distance of at least 25 percent of the height of the bed at rest and before said bed has reached a quiescent state.

2. The method of claim 1 wherein the initial pressure of the gas introduced into the bed of solids in step (b) is at least three times the pressure exerted by the weight of said bed of solids.

3. The method of claim 1 wherein the initial pressure of the gas introduced into the bed of solids in step (b) is from three to ten times the pressure exerted by the weight of said bed of solids.

4. The method of claim 1 wherein the gas introduced into said bed of solids in step (b) has an initial pressure in the range of three to ten times the pressure exerted by the weight of said bed of solids and is at an initial volume of one-half to one times the volume of said bed at rest.

5. The method of claim 1 wherein in step (d) the cycle is repeated before the upper surface has fallen to a position 10 percent higher than its position at rest.

6. The method of claim 1 wherein said bed of particulate solids comprises particles having diameters less than 100 microns.

7. The method of claim 1 wherein said bed of particulate solids comprises particles having diameters in the range of 10 to 5000 microns.

References Cited by the Examiner
UNITED STATES PATENTS

| | | | |
|---|---|---|---|
| 2,813,351 | 11/57 | Godel | 34—10 |
| 2,856,273 | 10/58 | Beber et al. | 23—1 |

CARL D. QUARFORTH, *Primary Examiner.*
MAURICE A. BRINDISI, *Examiner.*